United States Patent
Rajaraman et al.

(10) Patent No.: US 8,252,855 B2
(45) Date of Patent: Aug. 28, 2012

(54) LIQUID COLOR CONCENTRATE

(75) Inventors: Hari Rajaraman, Hudson, OH (US);
Stephen Cranney, Dacula, GA (US);
Thomas Majewski, Parma, OH (US);
Peter Prusak, Cleveland, OH (US)

(73) Assignee: PolyOne Corporation, Avon Lake, OH (US)

(*) Notice: Subject to any disclaimer, the term of this patent is extended or adjusted under 35 U.S.C. 154(b) by 252 days.

(21) Appl. No.: 12/294,281

(22) PCT Filed: Mar. 27, 2007

(86) PCT No.: PCT/US2007/064989
§ 371 (c)(1),
(2), (4) Date: Sep. 24, 2008

(87) PCT Pub. No.: WO2007/121044
PCT Pub. Date: Oct. 25, 2007

(65) Prior Publication Data
US 2009/0156732 A1  Jun. 18, 2009

Related U.S. Application Data

(60) Provisional application No. 60/744,885, filed on Apr. 14, 2006.

(51) Int. Cl.
*C09B 67/00* (2006.01)
*C08L 31/00* (2006.01)
*C07C 409/24* (2006.01)

(52) U.S. Cl. ............... 523/333; 524/556; 106/31.28; 560/1; 526/328

(58) Field of Classification Search .......... 524/60, 524/474, 521, 556, 522, 577; 523/206, 333, 523/351; 106/31.28; 562/6; 560/1; 526/328
See application file for complete search history.

(56) References Cited

U.S. PATENT DOCUMENTS

| | | | |
|---|---|---|---|
| 4,167,503 A * | 9/1979 | Cipriani | 260/33.2 |
| 4,624,983 A * | 11/1986 | Jarzombek et al. | 524/474 |
| 4,639,272 A | 1/1987 | Ito et al. | |
| 5,262,471 A | 11/1993 | Akao | |
| 5,308,395 A | 5/1994 | Burditt et al. | |
| 5,753,742 A * | 5/1998 | Bumanlag | 524/501 |
| 6,605,681 B1 | 8/2003 | Villalobos et al. | |
| 6,617,295 B2 | 9/2003 | Nitzsche | |
| 6,916,770 B2 | 7/2005 | Nitzsche | |
| 6,984,694 B2 | 1/2006 | Blasius, Jr. et al. | |
| 7,285,592 B2 * | 10/2007 | Harz et al. | 524/560 |
| 2002/0052429 A1 * | 5/2002 | Weier et al. | 523/221 |
| 2003/0176541 A1 * | 9/2003 | Pixton et al. | 524/88 |
| 2003/0211962 A1 * | 11/2003 | Held et al. | 510/475 |
| 2007/0161744 A1 | 7/2007 | Kabs et al. | |
| 2008/0119589 A1 * | 5/2008 | Majewski et al. | 524/35 |

FOREIGN PATENT DOCUMENTS

| | | |
|---|---|---|
| JP | 61215248 A | 9/1986 |
| WO | WO02/064667 A2 | 8/2002 |

OTHER PUBLICATIONS

Johnson Polymers "Plastics Additives—Flow Additives" www.joncryl.com (2006).

* cited by examiner

*Primary Examiner* — Vasu Jagannathan
*Assistant Examiner* — Hannah Pak
(74) *Attorney, Agent, or Firm* — John H. Hornickel

(57) ABSTRACT

A liquid color concentrate is disclosed, having a liquid acrylic-based polymer carrier; colorant; and optionally other functional additives. The colorant can be one or more pigments, one or more dyes, or combinations thereof. The liquid polymer is compatible with a variety of plastic resins, especially optically clear plastic resins, such as polycarbonate, polymethyl methacrylate, and styrene-acrylonitrile.

16 Claims, No Drawings

LIQUID COLOR CONCENTRATE

CLAIM OF PRIORITY

This application claims priority from U.S. Provisional Patent Application Ser. No. 60/744,885 and filed on Apr. 14, 2006, which is incorporated by reference.

FIELD OF THE INVENTION

This invention relates to use of a liquid polymer of an acrylic monomer as a carrier for colorants used as a concentrate for making colored plastic articles.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Attracting consumers to purchase individually-sized or family-sized containers includes branding and trade dress. Among the elements of valuable trade dress is the color of the container. Moreover, such color may need to co-exist with translucency, transparency, or other special effects for the bottle.

Existing liquid color concentrate technology uses carrier systems that are based on surfactants, oils and/or plasticizers. These products are often incompatible with many polymers resulting in loss of physical properties, processing problems like screw slippage. Many of the existing carriers affect the clarity of optically clear polymers, such as polycarbonate (PC), polymethyl methacrylate (PMMA), styrene-acrylonitrile (SAN). Therefore, liquid color concentrates are not used with these plastic resins.

Also existing color concentrate carriers have limited heat stability and not used to color polymers, such as PC which is processed at about 600° F. (315° C.).

Currently, pellet-based concentrates, and pre-colored resins are used. But such uses also present problems. Pellet-based concentrates for tint applications have be used at high dilution or "letdown" ratios to achieve good color distribution. Pre-colored resins are expensive to manufacture and warehouse. Such resins also undergo two heat histories (initial compounding and subsequent molding), which can be detrimental to some polymers.

SUMMARY OF THE INVENTION

What the art needs is a liquid carrier for color concentrates that need consistent and precise metering of colorant into the compound used to make the plastic article in a single or multi-stage process.

The present invention solves the problem in the art by using a liquid polymer of an acrylic monomer as a carrier for color concentrates.

One aspect of the invention is a color concentrate for plastic articles, comprising: (a) a carrier comprising a liquid polymer of an acrylic monomer; (b) colorant; and optionally (c) surfactant, optionally (d) at least one functional additive.

One feature of the present invention is that compounding the color concentrate of the present invention using an acrylic-based liquid polymer as the carrier permits letdown into the compounding equipment, via a fluid addition to the equipment.

Another feature of the present invention is that the colorant can include pigment(s), dye(s), or both as needed by the polymer engineer and product designer to achieve desired color effects.

Other features will become apparent from a description of the embodiments of the invention.

EMBODIMENTS OF THE INVENTION

Liquid Polymer of an Acrylic Monomer

The liquid carrier can be a liquid polymer (homopolymer or copolymer) of one or more acrylic monomers having a weight average molecular weight ranging from about 500 to about 200,000, and preferably from about 1000 to about 30,000, and most preferably about 1700.

The liquid polymer can have a glass transition temperature ranging from about −20° C. to about −100° C., and preferably from about −40° C. to about −80° C. and most preferably about −70° C.

Non-limiting examples of commercially available liquid polymers of acrylic monomer(s) include Joncryl® brand plastic flow additives from BASF (fka Johnson Polymers) of Racine, Wis., USA. These branded products are offered to the market as polymeric flow additives to improve plastic processing especially during injection molding. Of those flow additives, Joncryl® ADP-1200 and 1230 plastic flow additives are particularly preferred, with the former most preferred because ADP-1200 is a high efficiency acrylic fluid that provides flow with flexibility and can be used with a variety of plastics, such as acrylonitrile-butadiene-styrene (ABS), polyvinyl chloride (PVC), polybutylene terephthalate (PBT), Polycarbonate (PC), polymethyl methacrylate (PMMA), styrene-acrylonitrile (SAN), polyphenylene ether (PPE), styrene-butadiene-styrene (SBS), and, of course, acrylic polymers.

Colorant

As explained above, colorant can be a pigment, a dye, a combination of pigments, a combination of dyes, a combination of pigments and dye, a combination of pigment and dyes, or a combination of pigments and dyes. The choice of colorants depends on the ultimate color desired by the designer for the plastic article.

The science of color is well known to those skilled in the art. Without undue experimentation, one can use color matching techniques to identify a particular location in spherical color space. For example, one skilled in the art can use the teachings of PCT Patent Application US2004/012233 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business_and_Economy/Business_to_Business/Chemicals_and_Allied_Products/Pigments_and_Dyes/

Table 1 lists 51 commercially available pigment colorants in a variety of primary and secondary colors, 47 chromatics, 3 blacks, and 1 white.

TABLE 1

Commercial Pigment Colorants

| Raw Material Name | CI_Name | Family | COLOR | FDA* |
|---|---|---|---|---|
| TIOXIDE R-FC6 WHITE | PIGMENT WHITE 6 | INORGANIC | WHITE | Y |
| REGAL 660R BLACK POWDER | PIGMENT BLACK 7 | ORGANIC | | N |
| MPC CHANNEL BLACK | PIGMENT BLACK 7 | ORGANIC | | Y |
| BK-5099 BLACK OXIDE | PIGMENT BLACK 11 | INORGANIC | | N |
| HELIOGEN BLUE K7090 | PIGMENT BLUE 15:3 | ORGANIC | BLUE | Y |
| Heliogen Blue K6903 | PIGMENT BLUE B 15:1 | ORGANIC | BLUE | Y |
| 34L2000 AZURE BLUE | PIGMENT BLUE 28 | INORGANIC | BLUE | Y |
| 34L2001 AMAZON BLUE | PIGMENT BLUE 36 | INORGANIC | BLUE | N |
| NUBIX G-58 ULTRAMARINE BLUE | PIGMENT BLUE 29 | INORGANIC | BLUE | Y |
| NUBIX C-84 ULTRAMARINE BLUE | PIGMENT BLUE 29 | INORGANIC | BLUE | Y |
| NUBIX E-28 ULTRAMARINE BLUE | PIGMENT BLUE 29 | INORGANIC | BLUE | Y |
| HELIOGEN GREEN K-8730 | PIGMENT GREEN 7 | ORGANIC | GREEN | Y |
| HELIOGEN GREEN K 8605 | PIGMENT GREEN 7 | ORGANIC | GREEN | Y |
| CHROMIUM OXIDE GREEN G-6099 | PIGMENT GREEN 17 | INORGANIC | GREEN | Y |
| CROMOPHTAL ORANGE GP | PIGMENT ORANGE 64 | ORGANIC | ORANGE | Y |
| 2920 BRILLIANT ORANGE | PIGMENT ORANGE 79 | ORGANIC | ORANGE | Y |
| NOVAPERM RED F5RKA | PIGMENT RED 170 | ORGANIC | RED | N |
| 225-2480 Sunbrite Scarlet 60:1 | Pigment Red 60:1 | ORGANIC | RED | N |
| IRGALITE RED LCB | PIGMENT RED 53:1 | ORGANIC | RED | N |
| DCC-2782 Barium 2B Red | Pigment Red 60:1 | ORGANIC | RED | N |
| Lithol Scarlet 4451 | Pigment Red 48:2 | ORGANIC | RED | N |
| CROMOPHTAL RED 2020 | PIGMENT VIOLET 19 | ORGANIC | RED | Y |
| CROMOPHTAL MAGENTA P | PIGMENT RED 202 | ORGANIC | RED | Y |
| CROMOPHTAL PINK PT | PIGMENT RED 122 | ORGANIC | RED | N |
| PALIOGEN RED K 3911 HD | PIGMENT RED 178 | ORGANIC | RED | Y |
| CROMOPHTAL RED 2030 | PIGMENT RED 254 | ORGANIC | RED | Y |
| CROMOPHTAL RED 2028 | PIGMENT RED 254 | ORGANIC | RED | Y |
| Colortherm Red 110M | PIGMENT RED 101 | INORGANIC | RED | Y |
| Colortherm Red 130M | PIGMENT RED 101 | INORGANIC | RED | Y |
| Colortherm Red 180M | PIGMENT RED 101 | INORGANIC | RED | Y |
| CINQUASIA VIOLET RT-891-D | PIGMENT VIOLET 19 | ORGANIC | VIOLET | Y |
| CROMOPHTAL VIOLET GT | PIGMENT VIOLET 23 | ORGANIC | VIOLET | N |
| PREMIER VU UMV (6112) | PIGMENT VIOLET 15 | INORGANIC | VIOLET | Y |
| SICOTAN BROWN K 2750 FG | PIGMENT YELLOW 164 | INORGANIC | BROWN | N |
| FERRITAN FZ-1000 | PIGMENT YELLOW 119 | INORGANIC | Tan | Y |
| NUBITERM Y-905K ZINC FERRITE | PIGMENT YELLOW 119 | INORGANIC | Tan | Y |
| PV FAST YELLOW HG | PIGMENT YELLOW 180 | ORGANIC | YELLOW | Y |
| IRGALITE YELLOW WGPH | PIGMENT YELLOW 168 | ORGANIC | YELLOW | N |
| PV FAST YELLOW HGR (11-3071) | PIGMENT YELLOW 191 | ORGANIC | YELLOW | Y |
| PALIOTOL YELLOW K 2270 | PIGMENT YELLOW 183 | ORGANIC | YELLOW | Y |
| CROMOPHTAL YELLOW HRPA | PIGMENT YELLOW 191:1 | ORGANIC | YELLOW | Y |
| CROMOPHTAL YELLOW GRP | PIGMENT YELLOW 95 | ORGANIC | YELLOW | Y |
| IRGALITE YELLOW WSR-P | PIGMENT YELLOW 62 | ORGANIC | YELLOW | N |
| CROMOPTHAL YELLOW 3RLP | PIGMENT YELLOW 110 | ORGANIC | YELLOW | Y |
| 9766 FD&C YELLOW # 6 | PIGMENT YELLOW 104 | ORGANIC | YELLOW | Y |
| 9765 FD&C YELLOW # 5 | PIGMENT YELLOW 100 | ORGANIC | YELLOW | Y |
| PALIOTOL YELLOW K 0961 (HD) | PIGMENT YELLOW 138 | ORGANIC | YELLOW | Y |
| SICOPLAST YELLOW 10-0770 | PIG YEL 138/PIG YEL 183 | ORGANIC | YELLOW | Y |
| SICOTAN YELLOW K 2001 FG | PIGMENT BROWN 24 | INORGANIC | YELLOW | Y |
| SICOTAN YELLOW K 1011 | PIGMENT YELLOW 53 | INORGANIC | YELLOW | Y |

TABLE 1-continued

Commercial Pigment Colorants

| Raw Material Name | CI_Name | Family | COLOR | FDA* |
|---|---|---|---|---|
| COLORTHERM 10 | PIGMENT YELLOW 42 | INORGANIC | YELLOW | Y |

*As publicized by the commercial producer or as tested by the applicant, or both.

Table 2 shows 14 commercially available dyes.

TABLE 2

Commercial Dye Colorants

| Raw Material Name | CI Name | Family | Color | FDA* |
|---|---|---|---|---|
| Lambdaplast Blue NL | Solvent Blue 59 | Anthraquinone | Blue | N |
| Macrolex Blue RR Granular | Solvent Blue 97 | Anthraquinone | Blue | N |
| Macrolex Green G Granular | Solvent Green 28 | Anthraquinone | Green | N |
| Macrolex Green 5B Granular | Solvent Green 3 | Anthraquinone | Green | N |
| Macrolex Orange R Granular | Disperse Orange 47 | Polymethine | Orange | N |
| Macrolex Orange 3G Granular | Solvent Orange 60 | Perinone | Orange | N |
| Macrolex Red EG Granular | Solvent Red 135 | Perinone | Red | N |
| Macrolex Red E2G Granular | Solvent Red 179 | Perinone | Red | N |
| Thermoplast Red 454 | Solvent Red 195 | Anthraquinone | Red | N |
| Macrolex Red Violet R Granular | Disperse Violet 26 | Anthraquinone | Violet | N |
| Macrolex Violet B Granular | Solvent Violet 13 | Anthraquinone | Violet | N |
| Macrolex Violet 3R Granular | Solvent Violet 36 | Anthraquinone | Violet | N |
| Key Plast Yellow 3G | Solvent Yellow 93 | Pyrazolone | Yellow | N |
| Key Plast Yellow AG | Solvent Yellow 114 | Quinophthalone | Yellow | N |

*As publicized by the commercial producer or as tested by the applicant, or both.

Preferably, colorants include colorants intended for transparent or translucent plastic articles, although colorants intended for opaque plastic articles are not excluded from consideration.

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

The concentration of colorant into a carrier is significant because of the relative cost of the colorant ingredient(s) and the need for that color to consistently and precisely mix and disperse into the carrier and then to consistently and precisely dilute into the plastic resin and other compound ingredients during "letdown" of the concentrate in mixing equipment prior to formation of the pre-form embryonic bottles or other articles. Letdown ratios depend on the concentration of colorant in the color concentrate and whether the final molded product is intended to be opaque, translucent, or transparent.

Concentration of concentrate after letdown into the final molded product can range from about 0.05 to about 0.2 weight percent, and preferably from about 0.1 to about 0.5 weight percent.

The mixing equipment used to make the liquid color concentrate can be any suitable equipment already used in the art of making liquid color. For example, such equipment includes high speed "Cowles" type dispersors, media mills, three-roll mills and rotor-stator type dispersors Mixing equipment can operate at mixing speeds ranging from about 100 rpm to about 10,000 rpm, and preferably from about 500 to about 8000 rpm. Mixing equipment can operate at temperatures ranging from about 25° C. to about 100° C., and preferably from about 40° C. to about 80° C.

Optional Surfactant

Surfactants are sometimes desired to aid in dispersion of dyes and pigments. Commercially available surfactants include Surfynol brand defoaming oxirane surfactants from Air Products and Chemicals.

Optional Functional Additives

Additives to improve processing or performance of the concentrate of the present invention or the polyester compound, or both, can be added according to preferences of this skilled in the art. For example, functional additives for polyester bottles can include anti-oxidants, anti-stats acetaldehyde scavengers, blowing agents, biocides, exfoliated nanoclays, and the like. Generally, minor amounts of such additives provide improvement of performance to the color concentrate during processing with the other ingredients in the polyester resin or in performance of the polyester molded article after manufacturing. One skilled in the art without undue experimentation can determine the appropriate concentration.

Frequently, the preparation of a colored plastic article does not involve merely color but also special effect features, such as Granite, Translucent, Pearls, Metallics, Fluorescents, Iridescents, Marbles, etc.

Non-limiting examples of such additives are commercially available from PolyOne Corporation of Avon Lake, Ohio, USA (www.polyone.com) and marketed under the following brands: OnColor FX colorants, PolyOne colorants, etc.

Plastic articles exposed to natural sunlight are exposed to ultraviolet rays that can harm the color of the article. Therefore, it is customary but not required to include ultraviolet light stabilizers in the color concentrate. This optional additive being included in the color concentrate adds value to that concentrate as a masterbatch in polymer compounding because the ultraviolet stabilizer also helps protect the polymer resin from adverse effects arising from exposure to the ultraviolet rays. Being included in a masterbatch as an additive makes the introduction of the stabilizer easier, due to better dispersion.

Commercially available stabilizers are well known to those skilled in the art and include thermal stabilizers and Tinuvin brand stabilizers from Ciba-Geigy of Berne Switzerland. Of the choice of stabilizers, Tinuvin brand stabilizers are preferred, particularly Tinuvin 234 stabilizer.

Table 3 shows the acceptable, desirable and preferred weight percents of ingredients for color concentrates of the present invention.

TABLE 3

| Ingredient (Wt. %) | Acceptable Range | Desirable Range | Preferred Range |
|---|---|---|---|
| Liquid polymer of an acrylic monomer | 15-98% | 20-95% | 60-95% |
| Colorant | 2-75% | 5-60% | 10-40% |
| Optional Surfactant | 0-20% | 0-5% | 0.5-1.5% |
| Optional Functional Additives | 0-20% | 0-10% | 0-5% |

USEFULNESS OF THE INVENTION

Color concentrates of the present invention can be letdown into plastic resins and other ingredients useful for making molded or extruded articles in ratios ranging from about 0.01% to about 2.0%, and preferably from about 0.15% to about 0.50%.

As stated previously, the plastic resins can be such as acrylonitrile-butadiene-styrene (ABS), polyvinyl chloride (PVC), polybutylene terephthalate (PBT), polymethyl methacrylate (PMMA), styrene-acrylonitrile (SAN), polyphenylene ether (PPE), Polycarbonate (PC), styrene-butadiene-styrene (SBS), and, of course, acrylic polymers.

Because of the versatility of acrylic-based polymer carrier being compatible with so many different resins, consistent and precise dispersion of color into the plastic article is possible with delivery being in a convenient liquid form.

The plastic article can be opaque, translucent, or transparent even though it has color from concentrates of the present invention. Precise color matching and consistent metering of color in amounts as little as 0.08 weight percent of concentrate can be achieved.

Other embodiments appear in the examples.

EXAMPLES

Table 4 shows seven different sets of embodiments of the invention were made by milling, using a three roll mill of lab scale size. Molding trials were conducted in a variety of plastic resins, in which clarity is quite important. Molding was done in an injection molder. PC was molded at about 315° C. (600° F.). PMMA and SAN were molded at about 218° C. (425° F.). Color distribution was excellent in all examples, and no screw slippage was observed. Moreover, the liquid dispersions appeared to have no effect on clarity of the base clear resin.

Viscosities are also reported in Table 4. These viscosities show that the acrylic polymer wets out pigments and dyes very well and stable fluid dispersions can be produced. The viscosity range is optimum for good shelf life and ease of pumping.

Haze percentages are also reported in Table 4 for all Examples molded in PMMA resin, as compared with neat PMMA. The values show no appreciable change in haze as a result of using the liquid color concentrate of the present invention.

TABLE 4

| Example/Ingredients | 1 | 2 | 3 | 4 | 5 | 6 | 7 |
|---|---|---|---|---|---|---|---|
| Surfynol MD-20 surfactant | 1% | 1% | 1% | 1% | 1% | 1% | 0.30% |
| Joncryl ADP-1200 liquid acrylic polymer | 59% | 84% | 74% | 74% | 89% | 74% | 93.39% |
| Macrolex Red EG granular colorant | 40% | | | | | | |
| Macrolex Orange 3G granular colorant | | 15% | | | | | |
| Macrolex Blue RR granular colorant | | | 25% | | | | 1.33% |
| Macrolex Red E2G granular colorant | | | | 25% | | | |
| Heliogen Blue K-7090 colorant | | | | | 10% | | |
| Macrolex Violet B granular colorant | | | | | | 25% | |
| Raven 3500 black powder colorant | | | | | | | 2.84% |
| Macrolex Blue Violet B granular colorant | | | | | | | 0.14% |
| Cab-O-Sil M5 thickener | | | | | | | 2% |
| Total | 100% | 100% | 100% | 100% | 100% | 100% | 100% |
| Molding Trials | Molded at 0.25% by weight in PMMA, PC and SAN resins | Molded at 0.50% by weight in PMMA, PC and SAN resins | Molded at 0.25% by weight in PMMA | Molded at 0.25% by weight in PMMA | Molded at 0.25% by weight in PMMA | Molded at 0.25% by weight in PMMA | Molded at 0.25% by weight in PMMA |
| Viscosity | Viscosity of dispersion 8,400 cps | Viscosity of dispersion 11,680 cps | Viscosity of dispersion 4,200 cps | Viscosity of dispersion 10,040 cps | Viscosity of dispersion 3,400 cps | Viscosity of dispersion 6,000 cps | Viscosity of dispersion 4,000 cps |
| Haze % in PMMA samples* | 2.7% | 3.0% | 3.0% | 1.5% | 5.5% | 1.5% | 3.27% |

*Neat PMMA was tested also and had a percent haze of 2.8%.

The invention is not limited to the above embodiments. The claims follow.

What is claimed is:

1. A liquid color concentrate for plastic articles, comprising:
    (a) colorant;
    (b) a carrier for the colorant consisting essentially of a liquid polymer of an acrylic monomer; and
    optionally (c) surfactant, and
    optionally (d) functional additives,
    wherein the liquid polymer is the carrier for letdown of the colorant with consistent and precise metering of the colorant into a compound at a rate from about 0.01 weight percent to about 2.0 weight percent of colorant to the compound,
    wherein the liquid polymer is a homopolymer or a copolymer having a weight average molecular weight ranging from about 500 to about 200,000,
    wherein the liquid polymer has a glass transition temperature ranging from about −20° C. to about −100° C., and
    wherein the liquid polymer comprises from about 60 to about 95 weight percent of the liquid color concentrate.

2. The concentrate of claim 1, wherein the colorant comprises a pigment, a dye, a combination of pigments, a combination of dyes, a combination of pigments and dye, a combination of pigment and dyes, or a combination of pigments and dyes.

3. The concentrate of claim 1, wherein the liquid polymer is a homopolymer or a copolymer having a weight average molecular weight ranging from about 1000 to about 30,000.

4. The concentrate of claim 1, wherein the liquid polymer can have a glass transition temperature ranging from about −40° C. to about −80° C.

5. The concentrate of claim 1, wherein the colorant is present in the concentrate in an amount ranging from about 2 to about 75 weight percent, wherein the optional surfactant is present, if at all, in an amount ranging up to 20 weight percent, and wherein the optional functional additive is present, if at all, in an amount ranging up to 20 weight percent.

6. The concentrate of claim 1, wherein the colorant is present in the concentrate in an amount ranging from about 10 to about 40 weight percent, wherein the optional surfactant is present, if at all, in an amount ranging from about 0.5 to about 1.5 weight percent, and wherein the optional functional additive is present, if at all, in an amount ranging up to 5 weight percent.

7. The concentrate of claim 1, wherein the concentrate is combined with a plastic resin selected from the group consisting of acrylonitrile-butadiene-styrene (ABS), polyvinyl chloride (PVC), polybutylene terephthalate (PBT), polymethyl methacrylate (PMMA), styrene-acrylonitrile (SAN), polyphenylene ether (PPE), polycarbonate (PC), styrene-butadiene-styrene (SBS), and acrylic polymers, and combinations thereof, wherein the combination forms a colored plastic article.

8. The concentrate of claim 7, wherein the weight of concentrate in the plastic resin ranges from about 0.01 weight percent to about 2.0 weight percent.

9. The concentrate of claim 8, wherein the plastic article is opaque, translucent, or transparent.

10. A plastic article, comprising a concentrate of claim 1 let down into a plastic resin selected from the group consisting of acrylonitrile-butadiene-styrene (ABS), polyvinyl chloride (PVC), polybutylene terephthalate (PBT), polymethyl methacrylate (PMMA), styrene-acrylonitrile (SAN), polyphenylene ether (PPE), polycarbonate (PC), styrene-butadiene-styrene (SBS), and acrylic polymers, and combinations thereof.

11. The article of claim 10, wherein the weight of concentrate in the plastic resin ranges from about 0.01 weight percent to about 2.0 weight percent.

12. The article of claim 11, wherein the plastic article is opaque, translucent, or transparent.

13. The article of claim 12, wherein the plastic resin is optically clear.

14. The article of claim 10, wherein the concentrate of claim 1, wherein the colorant comprises a pigment, a dye, a combination of pigments, a combination of dyes, a combination of pigments and dye, a combination of pigment and dyes, or a combination of pigments and dyes.

15. The article of claim 10, wherein the liquid polymer is a homopolymer or a copolymer having a weight average molecular weight ranging from about 1000 to about 30,000.

16. The article of claim 10, wherein the colorant is present in the concentrate in an amount ranging from about 2 to about 75 weight percent, wherein the optional surfactant is present, if at all, in an amount ranging up to 20 weight percent, and wherein the optional functional additive is present, if at all, in an amount ranging up to 20 weight percent.

* * * * *